Aug. 20, 1935.　　C. H. GERLOFSON ET AL　　2,012,042
CUSHION
Filed July 23, 1932　　2 Sheets-Sheet 1
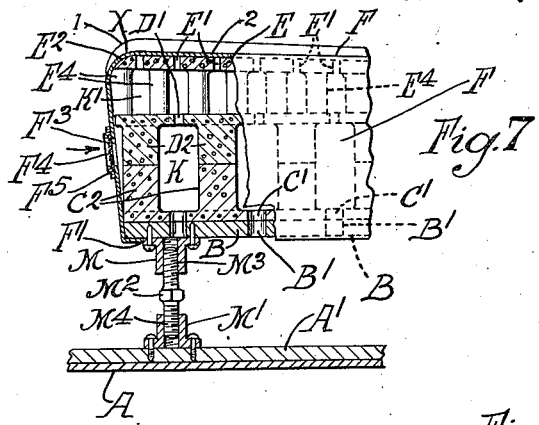
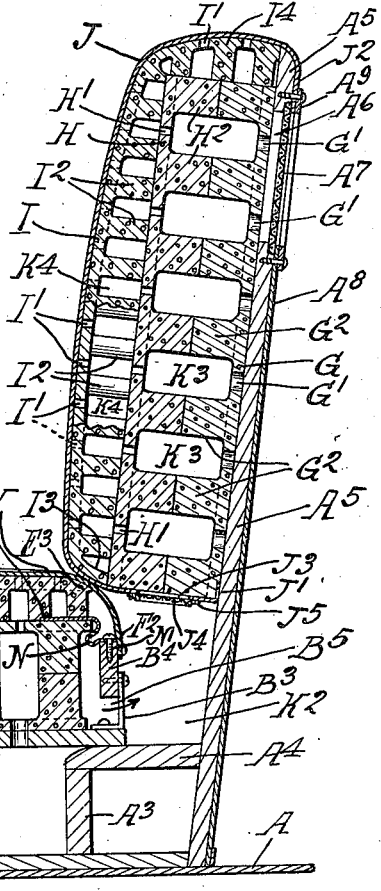
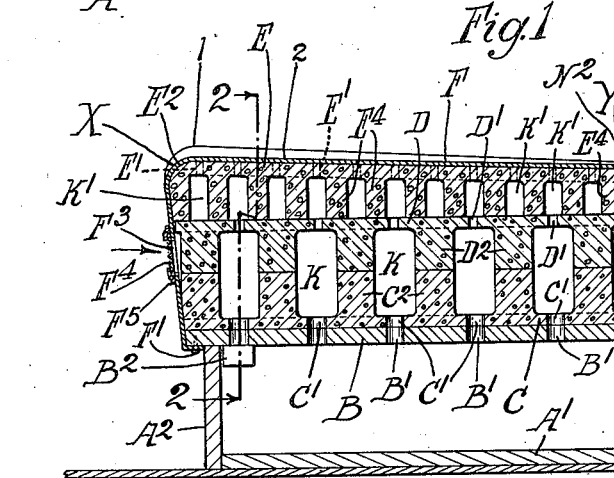
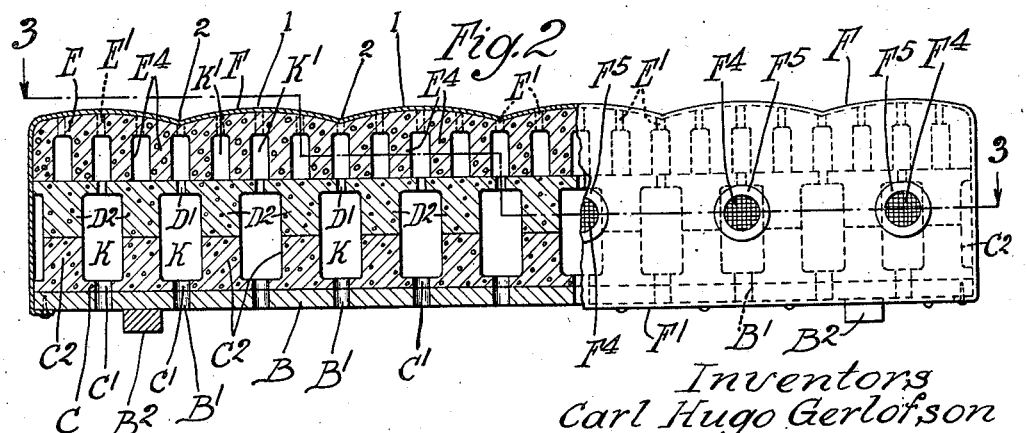
Inventors
Carl Hugo Gerlofson
Theodore J. Nelson
by Parker & Carter,
Attorneys.

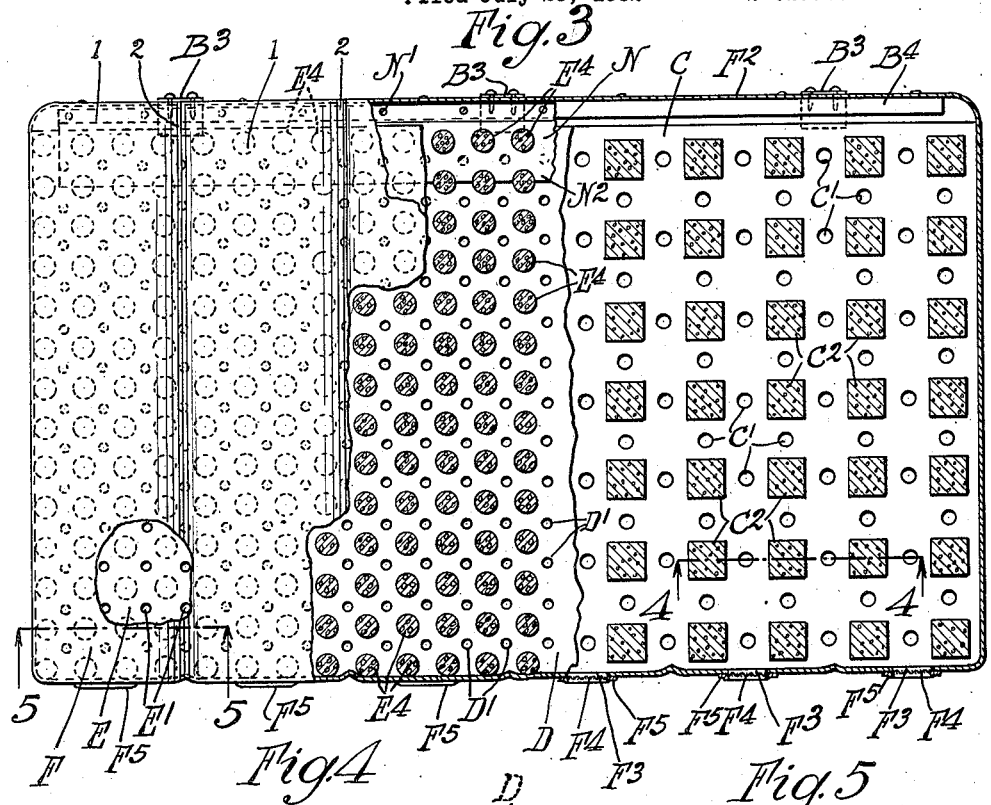
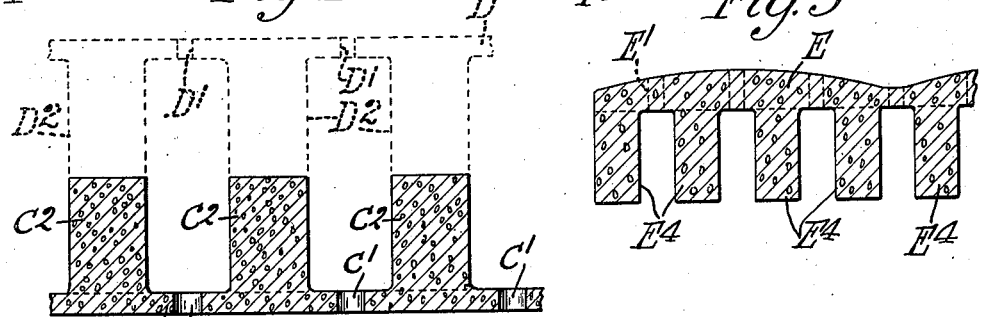
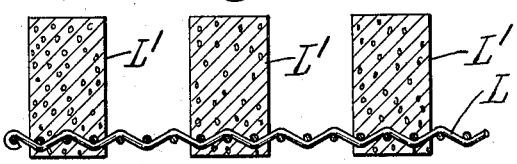

Patented Aug. 20, 1935

2,012,042

UNITED STATES PATENT OFFICE 2,012,042

CUSHION

Carl Hugo Gerlofson and Theodore J. Nelson,
Chicago, Ill.

Application July 23, 1932, Serial No. 624,182

4 Claims. (Cl. 155—179)

This invention relates to a cushion and particularly to a seat cushion for chairs. In the form illustrated herewith it is particularly adapted for use as a seat and back cushion of an automobile. It has for one object to provide a cushion which is ventilated throughout in which ventilation is provided up and down or transversely through the cushion and longitudinally back and forth through the cushion. Another object is to provide in connection with two cushions ventilation for the two in cooperation. Other objects will appear from time to time in the course of the specification and claims.

The invention is illustrated more or less diagrammatically in the accompanying drawings, wherein—

Figure 1 is a longitudinal vertical cross-section through an automobile seat;

Figure 2 is a transverse vertical cross-section taken at line 2—2 of Figure 1 with parts in elevation;

Figure 3 is a horizontal cross-section taken at line 3—3 of Figure 2 with parts in section and parts in plan;

Figure 4 is an enlarged sectional detail taken at line 4—4 of Figure 3, illustrating the lower portion of the cushion;

Figure 5 is an enlarged sectional detail taken at line 5—5 of Figure 3, showing the upper cushion member;

Figure 6 is a sectional view somewhat similar to Figure 4 illustrating a modified form of the lower portion of the cushion.

Figure 7 is a transverse vertical sectional detail, corresponding to Figure 1, but showing an adjustable modified form of front support.

Like parts are indicated by like characters throughout the specification and drawings.

A indicates a portion of the automobile frame or the floor board of the frame. $A^1$ is a seat frame member. $A^2$ is an upstanding frame member of the seat frame preferably joined to the frame member $A^1$. $A^3$ is an upwardly extending frame member and $A^4$ is a cooperating frame member providing a relatively extended surface to receive and support the cushion. $A^5$ is a back member upwardly extending and provided with one or more openings $A^6$ preferably adjacent its upper end. The opening may be partially closed by a fabric or screen member $A^7$. $A^8$ is a sheathing or covering for the member $A^5$ which may be of cloth, metal or any other suitable material. $A^9$ is a frame member extending about the opening $A^6$ and framing it and holding the sheathing in place about the opening. If there is more than one opening $A^6$ there will of course be a corresponding number of frames $A^9$.

In the form illustrated in Figures 1 and 2 the seat cushion includes a bottom member B which may be of wood or other relatively stiff material and is provided with a plurality of perforations $B^1$. One or more spacing members $B^2$ are positioned on the bottom of the frame member B. Adjacent its rear end one or more angles $B^3$ are fastened to the member B in any suitable manner and yet may carry along their upper edge a frame member $B^4$ so that the angles $B^3$ and the frame member $B^4$ together form a relatively stiff or unyielding rear edge for the cushion, with gaps or spaces $B^5$ between the angles $B^3$.

The lower portion of the cushion is formed of a sheet like member C which is of yielding material preferably rubber and may be of sponge rubber. It is perforated as at $C^1$. The perforations may be of any desired shape and are here shown as being circular merely for illustrative purposes. A plurality of upwardly extending fingers or columns $C^2$ is attached to the sheet like member C and these columns or fingers $C^2$ may if desired be made integral with the sheet C.

Superimposed upon the lowermost cushion portion formed of the member C and the columns $C^2$ is a second portion which is generally the same in construction and shape as the lowest portion but is reversed in position. It is formed of a sheet like member D perforated as at $D^1$ and provided with columns or fingers $D^2$ generally of the same size, shape and location as the fingers $C^2$. The fingers or columns $D^2$ are positioned upon the fingers or columns $C^2$ and fastened to them and thus form in effect continuations of them, and the upper and intermediate cushion portions thus form in effect a main lower cushion by an upper and lower sheet like member and supported by the composite column or finger members $C^2$, $D^2$. The perforations $D^1$ may be smaller than the perforations $B^1$, but this is not essential.

Superimposed upon the lower cushion portion is an upper or surface cushion formed of a sheet like member E perforated as at $E^1$. This member may be of greater height at one side of the cushion than at the other, as indicated for example in Figure 1 in which at the forward edge of the cushion as at X the cushion is higher than it is at its rear edge as at Y. The surface cushion member may have rounded edges as at $E^2$ $E^3$ and is provided with a plurality of downwardly depending column or finger-like portions $E^4$.

These members E⁴ rest upon the surface of the sheet member D and are secured to it for example by cement or in any other suitable way.

Columns E⁴ are offset with respect to column or finger members C², D² and are positioned to bear partially on the column or finger members C², D² and partially on the web portion between the columns C², D²; columns E⁴ being relatively smaller than columns C², D². By this arrangement a greater degree of flexibility is provided for the upper part of the cushion support and distinct from the particular texture of the rubber due to its composition.

Surrounding the entire cushion on its top and sides is a fabric covering F which is preferably fastened as at F¹ at the forward edge to the bottom member B of the cushion and at its rear edge as at F² to the frame member B⁴. The member F may be provided with one or more openings or perforations F³ which are partially closed by screen portions F⁴ held in place by frame members F⁵ which engage the screen and the fabric covering. The upper or surface member E may be shaped on its top to provide a plurality of raised portions (1) separated by a plurality of depressed portions or valleys (2).

The back or rear cushion which cushions the back of the automobile seat is substantially the same in construction as the lower or seat cushion which is described, being modified generally insofar as is necessary to adapt it for use as a back cushion to be leaned against instead of a seat cushion to be sat upon. It comprises a sheet like portion G perforated as at G¹ and having column or finger like members G². Fastened to it is an intermediate sheet like member H perforated as at H¹ and having column or finger members H² which are fastened to the members G². The outer or surface member is formed of a sheet like portion I perforated as at I¹ and having fingers I² which rest upon and are fastened to the outer surface of the sheet H. At its lower edge the sheet like portion I is downwardly inclined as at I³ and itself directly contacts and is fastened to the sheet H. Adjacent its upper edge it is curved and carried about the upper end of the main cushion portion as at I⁴. This portion is fastened to or abuts against the upper edge of the frame member A⁵. Thus, the outer or surface cushion member including the sheet portion I and the fingers attached to it extends over one face of the inner cushion member and over fingers G² and H² and also surrounds this cushion member along one or more edges.

A fabric covering J surrounds the back cushion and may be fastened under its lower edge as at J¹ and is fastened about its upper edge as at J². It is provided with one or more openings J³ preferably corresponding to the openings between the fingers or columns G² and H², and screening J⁴ held in place by frame members J⁵ may be positioned over these openings.

The cushion above described provides air spaces K in the main portion of the lower seat cushion. These are the spaces between the columns C² and D². They are in communication with the outer air through the openings F³ along the front of the cushion and through the spaces B⁵ along the rear of the cushion openings similar to the openings F³ may be left on the sides of the cushion. The spaces K are also in communication with the air below through the perforations C¹ and B¹ and above through the perforations D¹ and E¹, the latter formed in the upper or surface sheet like member E. Air spaces K¹ K¹ are left in the upper or surface member between the fingers E⁴ and the fabric which covers the cushion is somewhat porous so that air may pass through it into and out of the air spaces K¹ and thus air may circulate through the fabric and through the entire cushion. Air will enter as indicated in the arrow in Figure 1 through the openings F³ and it may leave as indicated also by arrows in Figure 1 through the openings B⁵ in the rear of the cushion. The air passage or space K² is defined in the rear of the seat cushion and below the back cushion. This space is enclosed by the frame members A⁴ A⁵ as well. Air spaces K³ are left in the main body of the back cushion between the column members G² and H² and in communication with the openings J³ in the lower edge of the back cushion. Air spaces K⁴ are left in the outer or surface portion of the back cushion between the fingers or columns I². Air may thus circulate through the entire body of the back cushion. It may enter through the porous fabric covering J from the front or sides or top of the cushion or it may enter through the openings J³. Air may also escape from any portion of the cushion. In practice it is found that where the seat is applied to an automobile a current of air will enter the openings F³, will pass rearwardly through the seat cushion, will leave the seat cushion through the openings B⁵, enter the back cushion through the openings J³ and leave that cushion through the opening or openings A⁶. There is thus established through the cushion a well defined current of air which ventilates and cools the cushion. Also, since the air can enter and leave the cushion at practically any part of its surface there will be some cross currents and an increased circulation of air within the cushion and an increased movement of the air into and out of the cushion.

In Figure 6 there is shown a modified form of the cushion. Instead of the sheet member C as shown in Figure 4 a mesh fabric such for example as a wire mesh cloth L may be used and columns or fingers L¹ of rubber may be molded directly upon this fabric. Such a cushion thus has within it a reinforcing and a spacing member which spaces and retains in position the columns L¹. A cushion member of this type may be used in the cushions shown in Figures 1 and 2. In some uses where the wire mesh reinforcing is used it will be unnecessary to have the relatively rigid backing or supporting member B.

In Figure 7 there is shown a modification for the support at the forward end of the cushion. Instead of resting the forward edge or end of the cushion upon the fixed frame member A² it may rest upon an adjustable member by means of which it may be raised and lowered. This adjustable member comprises a pair of threaded parts M, M¹, respectively, mounted upon the floor of the car and upon the bottom of the cushion. Between them is a column like member M² which is provided with oppositely threaded portions M³, M⁴, respectively, threaded into the socket portions M, M¹. Rotation of the column member in one direction will raise the forward edge of the cushion and rotation in the opposite direction will lower it.

It will be realized that whereas our invention is herewith shown and described as a practical operation device, nevertheless many changes might be made in the size, shape, number and disposition of parts without departing from the spirit of the invention and we wish, therefore, that our showing be taken as in a sense diagrammatic. In particular, the details of the construction of the cushions and their mounting might be almost infinitely varied. We have suggested that they are of sponge rubber formed of separate portions which are fastened together in the final cushion. The cushions might of course be cast as a unit. The finger or column portions might be cast as a unit to the sheet members to which they are attached or they might be made separately and fastened to the sheet members, by cementing or stapling, by reinforcing or by any other means. The coverings for the cushion might for some purposes be omitted or where used almost any sort of cushion covering might be employed and it is not necessary that the cushion covering be air pervious. For many purposes the openings $F^3$, $B^5$, $J^3$ and $A^6$ are sufficient to provide adequate air circulation and where these are found sufficient the covering need not be porous or air pervious. Ordinarily, it is preferable to make it porous.

To prevent excess forward movement of the seat cushion one or more preferably flexible members N are used. They may be attached to the rigid rear member as at $N^1$ and at their forward ends or edges they may be cemented between the surface and intermediate cushion sections as at $N^2$.

The cushion is preferably made of rubber and particularly of sponge rubber. We prefer ordinarily to make the upper member of the seat cushion and outer member of the back cushion of rubber having a different texture or softness from that which forms the rest of the cushion. In the form shown, the main body of the cushion is formed of sponge rubber of one texture and the top of the seat cushion and the outer side of the back cushion are made of sponge rubber of softer and more yielding texture.

If desired the shape and dimensions of the cushions may be greatly varied. For some purposes it will not be necessary to add the upper surface member and the cushion will be formed of the two lower parts C and D, or for some purposes there need be only one lower part such as the part C, and the upper part E may be attached directly to it. In some cases a member generally like the upper part E may be used as a cushion or upholstery member without either of the lower parts C or D. The member E need not always have the curved or uneven upper surface as indicated particularly in Figures 2 and 5. Its upper surface might be flat or plane. The upper member E, whatever its shape, may be made in any size. It might for example be made "by the yard" and at the time of use cut into any size or shape and used just as a fabric would be used, or in any other manner.

Where in the specification and claims we have referred to the free circulation of air, or the free ventilation, we mean by that a degree of circulation greater than that possible through the fabric of the material, whether it be rubber or anything else. We mean the circulation and ventilation which is possible only by the existence within the body of the cushion of relatively large, open and unobstructed passages and chambers.

The use and operation of our invention are as follows:

While the cushions of this invention are not limited to use in automobiles they are shown as applied to that purpose. In general, they are applicable to any form of cushioning or upholstering.

In the forms shown, the passenger of an automobile is seated upon the seat cushion and leans against the back cushion. The air may circulate freely through the cushion and may enter and leave at the sides, the top or the bottom of the several cushion members. It has been found that where the operator shifts from side to side and shifts his position upon the cushion, he will depress one portion and permit another portion to rise. Any such movement of the user on the cushion causes some part of the cushion to be compressed and permits another part to expand and such movement automatically alters the capacity of some of the air passages within the cushion and thus forces air out of one portion and draws it into another so that the movement of the user on the cushion sets up in effect an irregular pumping or air circulating action. This is true of the use of such cushions whether they be applied to automobile seats or to any other form of upholstery. When the cushion is used as an automobile seat and the vehicle is driven forward it has been found that air will enter at the openings in the forward end of the seat cushion and be forced thence through the cushion out of its rear edge and up to the back cushion and out to the rear and adjacent the top of the back cushion. This movement is in addition to the irregular action due to the movement of the user above described.

For certain purposes it may be desirable to provide forced draft to blow air positively into the front of the cushion. When that is done a fan or blower may be connected so as to blow air forcibly through the openings $F^G$ and if this is done air of course will be forcibly exhausted through the openings $A^7$. Whatever the means for bringing air into the cushion in a relatively defined current or path air is ordinarily constantly entering and leaving the cushion through the side and surface openings.

One important advantage inherent in cushions of this type is that they not only yield vertically or in the line of main compression but the surfaces of these cushions in contact with the user move with the user. Thus, in the case of the seat cushion upon which the user sits, backward and forward movement of the user with respect to the vehicle merely bends or moves the upper surfaces of the cushion back and forth along a line more or less parallel to the floor of the vehicle so that the user does not slide on the seat but a large part of the cushion bodily moves back and forth with the user.

Correspondingly, the back cushion against which the user leans is not only compressible in a line generally at right angles to the plane of the support $A^5$ but may be distorted along a line generally parallel to the plane of the support $A^5$ and thus as the user moves up and down due to jolts and jars sustained by the vehicle he does not slide with respect to the rear cushion. It moves and bends with him and is distorted as he moves so that there is no sliding between the user and the cushion. There is thus none of the usual objectionable tendency of the rear cushion to displace the clothing of the user and particularly of the driver of an automobile.

We claim:

1. In a cushion having a relatively rigid base member, a group of rubber columns supported thereon, a resilient sheet-like member supported upon said columns, a second group of relatively smaller rubber columns supported upon said sheet-like member, there being an appreciably larger number of said smaller columns in the second group than the number of larger columns in the first mentioned group whereby said smaller columns are partially supported on the portions of the resilient sheet-like member lying between the columns of the first group, and a second sheet-like member supported upon said columns of the second group, the relatively smaller rubber columns of the second group providing a greater degree of flexibility to the upper portion of the cushion.

2. In a cushion having a relatively rigid base member, a group of rubber columns supported thereon, a resilient sheet-like member supported upon said columns, a second group of relatively smaller columns supported upon said sheet-like member, a second sheet-like member supported upon said second group of columns, the columns of said second group supported by said first mentioned sheet-like member and offset with respect to the columns of the first group, whereby to provide a greater degree of flexibility for the upper group of columns of the cushion.

3. In a cushioned seat, a relatively rigid air pervious base member, and an air pervious rubber cushion positioned thereon, said rubber cushion being formed of a pair of perforate sheets, each having integrally formed with it a plurality of column portions, the columns of the two sheets being placed end to end and secured together, and an additional sheet-like member formed of material more readily compressible than that of the two first mentioned members, and provided with columns resting upon the uppermost of the first mentioned sheet-like members, the sides of the cushion being open for free air circulation, and an air pervious cover positioned over the top and sides of said rubber cushion.

4. In a cushioned seat, a plurality of relatively rigid air pervious supports, and an air pervious rubber cushion positioned on each of said supports, said rubber cushions being formed of pairs of perforate sheets, each having integrally formed with it a plurality of column portions, the columns of the two sheets being placed end to end and secured together, and an additional sheet-like member formed of material more readily compressible than that of the two first mentioned members, and provided with columns resting upon the uppermost of the first mentioned sheet-like members, the sides of the cushions being open for free air circulation, and an air pervious cover positioned over the top and sides of said rubber cushions, said cushions being disposed angularly with respect to each other, and means for causing circulation of air from the edge of one cushion to and through the edge of the other cushion.

CARL HUGO GERLOFSON.
THEODORE J. NELSON.